H. PAKEMAN.
FLY CATCHER.
APPLICATION FILED NOV. 15, 1915.

1,233,696.

Patented July 17, 1917.

Witnesses
R. M. McCormick
A. L. Phelps

Inventor
Harry Pakeman

By
C. C. Shepherd, Attorney

UNITED STATES PATENT OFFICE.

HARRY PAKEMAN, OF COLUMBUS, OHIO.

FLY-CATCHER.

1,233,696. Specification of Letters Patent. Patented July 17, 1917.

Application filed November 15, 1915. Serial No. 61,663.

*To all whom it may concern:*

Be it known that I, HARRY PAKEMAN, a subject of Great Britain, residing at Columbus, in the county of Franklin and State of Ohio, have invented certain new and useful Improvements in Fly-Catchers, of which the following is a specification.

This invention relates to fly catchers designed principally for use in places where the public congregate, such as restaurants, hotels, etc., although if desired it may be used to great advantage in residences.

The main object of my invention resides in so constructing the catcher that by resorting to the use of a fan, the flies are sucked or drawn into a space especially provided for their retainment. After this, they may be killed or otherwise done away with, as may be desired.

A further object of my invention resides in a peculiarly shaped casing for encircling the motor which carries the fan, this casing being so shaped to present a line contact with a counter or other level surface along which it may be moved. In this way, a column of air of considerable width may be made to sweep across the surface.

Figure 1:
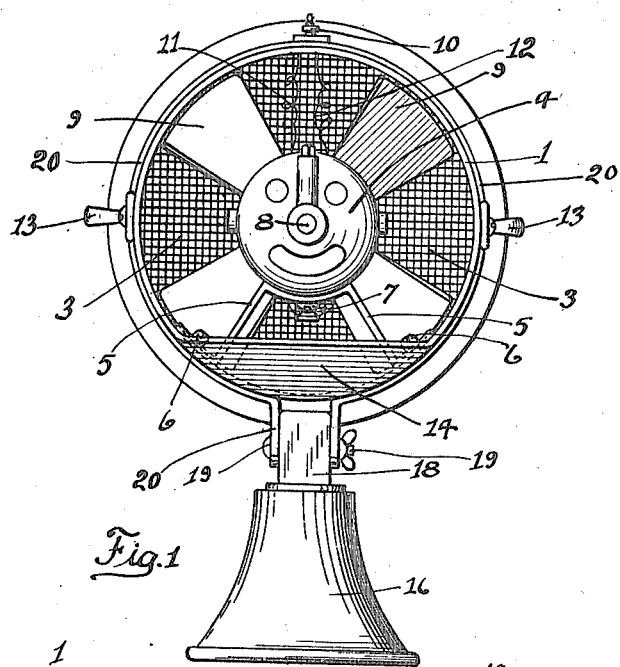
Figure 2:
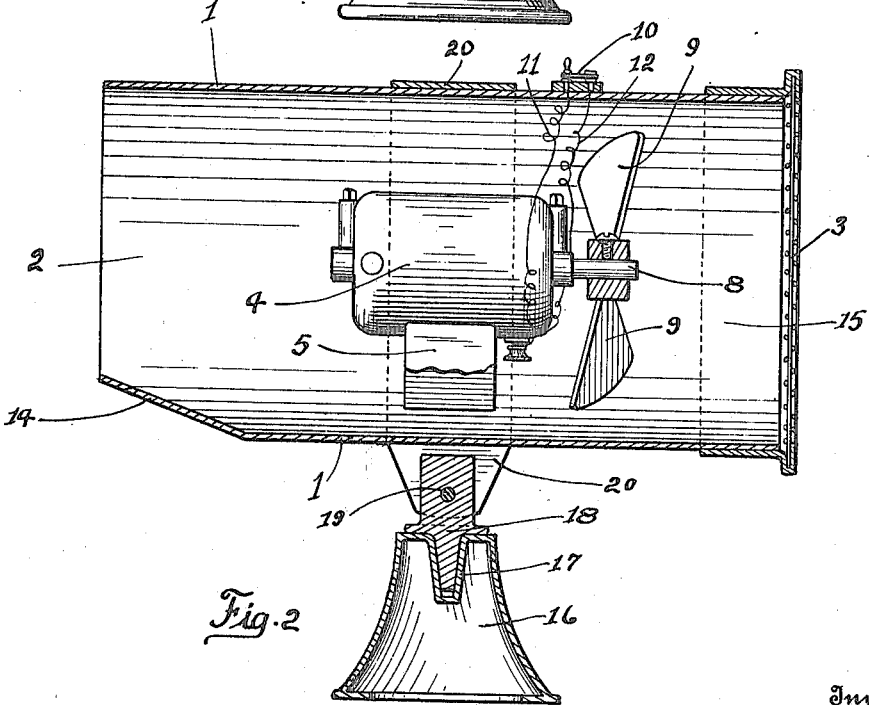

The preferred embodiment of my invention is shown in the accompanying sheet of drawings, in which similar characters of reference designate corresponding parts, and in which:

Figure 1 is an end elevation of my fly catcher and is taken looking from the left of Fig. 2, and, Fig. 2 is a vertical longitudinal section of the structure shown in Fig. 1.

In these drawings, there is shown a casing 1 preferably cylindrical and open at its front end, which is indicated at 2 and closed at its rear end by means of a screen 3 or its equivalent. This screen 3 is designed only to permit the outflow of air and to prevent the passage therethrough of the captured flies, so it will be evident that any type of closure having a mesh sufficiently close to prevent the escape of the flies and at the same time permit the escape of the indrawn air, will be sufficient. A motor 4 is centrally mounted within this casing by means of a supporting bracket 5, this bracket being held in the casing through the medium of the screws or bolts 6 and the motor held to the bracket by means of the screw 7. The shaft 8 of this motor is extended toward the rear end of the casing and rigidly carries a fan 9 by means of which a suction through the open end 2 is created. This motor derives its current from any suitable source which may be connected to the switch shown at 10 and wires 11 and 12 from this switch, then transfer the current to the motor direct. At diametrically opposite points, the casing is provided with a pair of handles as is shown at 13, these handles serving the purpose for conveniently transporting the device as a whole from place to place. In order that the casing may have a line contact with a counter or other surface, its front portion is flattened as is shown at 14 and then by means of the handles 13, the device as a whole may be moved along the counter. When this is done and the motor set in operation to turn the fan 9, the suction created will be sufficient to draw all flies and similar insects into the open mouth portion 2 and through the fan wheel 9 into the space 15 between this fan wheel and the wire closure 3. In a majority of cases, the fan blades will strike the fly to kill it, but those which may escape may, of course, be destroyed as desired.

Should it be desired to seat the device upon a counter and leave it operate for a given period, this may be accomplished by means of the socketed supporting piece shown at 16, the socket 17 serving to receive the swivel pin 18. To this swivel pin 18 there is also pivotally attached by means of a butterfly nut and bolt 19, an embracing band 20, this latter embracing the motor supporting casing 1. By means of the swivel mounting, the direction at which the draft is directed, may be varied at will and the device left in continued operation. It will, of course, be understood that the draft created is sufficient to suck in all flies which may cross its path at some considerable distance.

From the foregoing description, it will be apparent that I have provided a novel structure designed to catch all flies within a considerable distance from the open mouth portion 2. This is accomplished by the high speed at which the fan 9 is rotated and the draft created is allowed to escape through the screen portion 3, the mesh of the screen portion being sufficiently close to prevent the escape of flies therethrough. The draft is also sufficient to cause a depositing of the flies upon this screen with considerable force and those which may escape encountering the fan blades, will, of course, be forced against the screen with considerable force. In all events, none of the captured flies can escape as long as the fan blade is in operation.

The device is also constructed so that it may be readily transported by either its removal from the standard 16 or by removing it from the band 20. The inclination of the flattened portion 14 is such as will give a wide contact with any flat surface and thus render the device more effective than would be the case if the cylinder had only a point contact.

While I have described my invention as a fly killer, it will be understood that I do not limit myself to this use only, as it will operate with equal efficiency in other capacities as, for instance, a crumb remover, etc.

What I claim, is:

1. A device of the character described comprising a casing open at its front end and provided with a sieve rear wall, said casing being formed at its front end to present a line contact with a flat surface, a fan located within and between the ends of said casing, and means for driving said fan.

2. A device of the character described comprising a tubular casing open at its front end and provided with a sieve rear wall, said casing having a flattened portion at its front end to present a line contact with a flat surface, a motor centrally supported within and between the ends of said casing, and a fan carried by said motor.

3. A device of the character described comprising a casing open at its front end and provided with a sieve rear wall, a fan located within and between the ends of said casing, a motor within said casing for driving said fan, a supporting standard, and means for universally mounting said casing in connection with said standard, said means including a band removably clamped in connection with said casing.

4. A device of the character described comprising a casing open at its front end and provided with a sieve rear wall, a fan located within and between the ends of said casing, a motor within said casing for driving said fan, a socketed supporting standard, a swivel pin rotatably and removably seated in said standard, a clamping band encircling said casing, and means for pivotally attaching said band to said pin.

In testimony whereof I affix my signature in presence of two witnesses.

HARRY PAKEMAN.

Witnesses:
WALTER E. L. BOCK,
A. L. PHELPS.

Copies of this patent may be obtained for five cents each, by addressing the "Commissioner of Patents, Washington, D. C."